US008288911B2

(12) United States Patent
Tan et al.

(10) Patent No.: US 8,288,911 B2
(45) Date of Patent: Oct. 16, 2012

(54) NON-LINEAR DIELECTRICS USED AS ELECTRICAL INSULATION FOR ROTATING ELECTRICAL MACHINERY

(75) Inventors: Qi Tan, Rexford, NY (US); Patricia Chapman Irwin, Altamont, NY (US); Manoj Ramprasad Shah, Latham, NY (US); Yang Cao, Niskayuna, NY (US); Abdelkrim Younsi, Ballston Lake, NY (US); Michael Francis Ciccarelli, West Sand Lake, NY (US); Christina Lea McHugh, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 765 days.

(21) Appl. No.: 11/639,726

(22) Filed: Dec. 15, 2006

(65) Prior Publication Data

US 2008/0143209 A1    Jun. 19, 2008

(51) Int. Cl.
*H02K 3/30* (2006.01)
(52) U.S. Cl. ........................................................ 310/196
(58) Field of Classification Search .................. 310/196; H02K 3/30, 3/32, 3/34, 3/38, 3/40
See application file for complete search history.

(56) References Cited

U.S. PATENT DOCUMENTS

| | | | |
|---|---|---|---|
| 3,265,998 A | 8/1966 | Park | |
| 3,748,503 A * | 7/1973 | Cobarg et al. | 310/331 |
| 3,770,877 A * | 11/1973 | Mashikian et al. | 174/143 |
| 3,777,198 A * | 12/1973 | Anderson et al. | 310/200 |
| 3,824,683 A * | 7/1974 | Rhudy | 29/596 |
| 4,212,914 A * | 7/1980 | Ponomareva et al. | 442/117 |
| 4,219,791 A | 8/1980 | Moore et al. | |
| 5,113,104 A | 5/1992 | Blaettner et al. | |
| 5,382,862 A | 1/1995 | Ward et al. | |
| 5,710,475 A * | 1/1998 | Irwin et al. | 310/45 |
| 6,287,691 B1 * | 9/2001 | Decaumont et al. | 428/379 |
| 6,317,962 B1 | 11/2001 | Adachi et al. | |
| 6,663,816 B2 * | 12/2003 | Younsi et al. | 264/272.2 |
| 6,778,053 B1 | 8/2004 | Irwin et al. | |
| 6,864,667 B2 | 3/2005 | Buening et al. | |
| 7,026,554 B2 | 4/2006 | Lee et al. | |
| 7,073,247 B2 | 7/2006 | Rowe et al. | |
| 2003/0138733 A1 * | 7/2003 | Sachdev et al. | 430/311 |
| 2004/0263021 A1 * | 12/2004 | Irwin et al. | 310/215 |
| 2005/0072592 A1 | 4/2005 | Lee et al. | |

FOREIGN PATENT DOCUMENTS

DE    4438187    5/1996

OTHER PUBLICATIONS

OA Response, Application No. 07 122 336.6-1214, Dec. 29, 2009.
DE4438187, Abstract, May 2, 1996.

* cited by examiner

*Primary Examiner* — Quyen Leung
*Assistant Examiner* — Michael Andrews
(74) *Attorney, Agent, or Firm* — Joseph J. Christian

(57) ABSTRACT

An electrical machine including a winding made of a conductive material is disclosed. The electrical machine also includes an insulating layer disposed around at least a portion of the winding having a dielectric constant that varies as a function of voltage.

8 Claims, 5 Drawing Sheets

NON-LINEAR DIELECTRICS USED AS ELECTRICAL INSULATION FOR ROTATING ELECTRICAL MACHINERY

BACKGROUND

The invention relates generally to insulating systems for electrical machines and machine windings, and more specifically to an insulation system having non-linear dielectric properties.

Electrical machines and devices such as generators, motors, actuators, transformers, etc. are constantly subjected to various electrical, mechanical, thermal, and environmental stresses. Such stresses tend to degrade them, consequently reducing their lives. In an example, a static magnetic field is retained after power is disconnected in a steel core in transformers due to magnetic remanence. When power is further reapplied, residual field causes a high inrush current until effect of the magnetic remanence is reduced, usually after a few cycles of applied alternating current. Overcurrent protection devices such as fuses in transformers connected to long overhead power transmission lines are unable to protect the transformers from induced currents due to geomagnetic disturbances during solar storms that may cause saturation of the steel core, and false operation of transformer protection devices. It has been commonly observed that deterioration of insulation in the foregoing devices is a dominant factor in their failures.

Insulation systems for electrical machines such as generators, motors and transformers have been under constant development to improve performance of the machines. Materials generally used in electrical insulation include polyimide film, epoxy-glass fiber composite and mica tape. Insulating materials generally need to have the mechanical and physical properties that can withstand various electrical rigors of the electrical machines such as lightning and switching surges. In addition, some of the desirable properties of an insulation system include withstanding extreme operating temperature variations, and a long design life.

The aforementioned insulating materials have an essentially constant dielectric constant, which protects them from electrical conduction based on their respective composite breakdown strengths. However, certain factors such as operating temperatures, environment, voltage stresses, thermal cycling and voltage surges from lightning and switching deteriorate the insulating materials over a long period of time thus reducing their useful or operational life.

Therefore, it would be desirable to provide an insulation system that would address the aforementioned problems and meet the current demands of industry applications.

BRIEF DESCRIPTION

In accordance with one aspect of the invention, an electrical machine is provided. The electrical machine includes a winding made of a conductive material. The electrical machine also includes an insulating layer disposed around at least a portion of the winding having a dielectric constant that varies as a function of voltage.

In accordance with another aspect of the invention, a winding of an electrical machine is provided. The winding includes a polymeric insulation system including at least one polymeric layer having a dielectric constant that varies as a function of voltage.

In accordance with another aspect of the invention, a generator is provided. The generator includes a stator. The generator also includes a rotor configured to generate current in the stator. The generator further includes a winding that includes a plurality of conductors around the stator and surrounded by an insulating layer having a dielectric constant that varies as a function of voltage.

In accordance with another aspect of the invention, a method of forming an insulation in an electrical machine is provided. The method also includes disposing an insulating layer around at least a portion of the winding having a dielectric constant that varies as a function of voltage.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include an insulation system using non-linear or varying dielectric property materials. As used herein, the term "non-linear" refers to a non-uniform change in dielectric constant with voltage. The insulation system disclosed herein may be employed in machines operating at high voltages such as, but not limited to, dynamoelectric machines. The insulation system includes an inherent adaptive property such that the dielectric constant of the non-linear dielectric may increase at locations in the machine insulation experiencing high electrical stress and provide desirable electrical protection to the machine. The electrical protection is obtained through electrical stress smoothing and reduction in the local electric field intensity. The nonlinear dielectric materials also provide improved thermal conductivity of the insulation system thereby allowing more heat to be removed from a metal, such as, but not limited to, copper of a stator bar system to outside environment.

Figure 1:
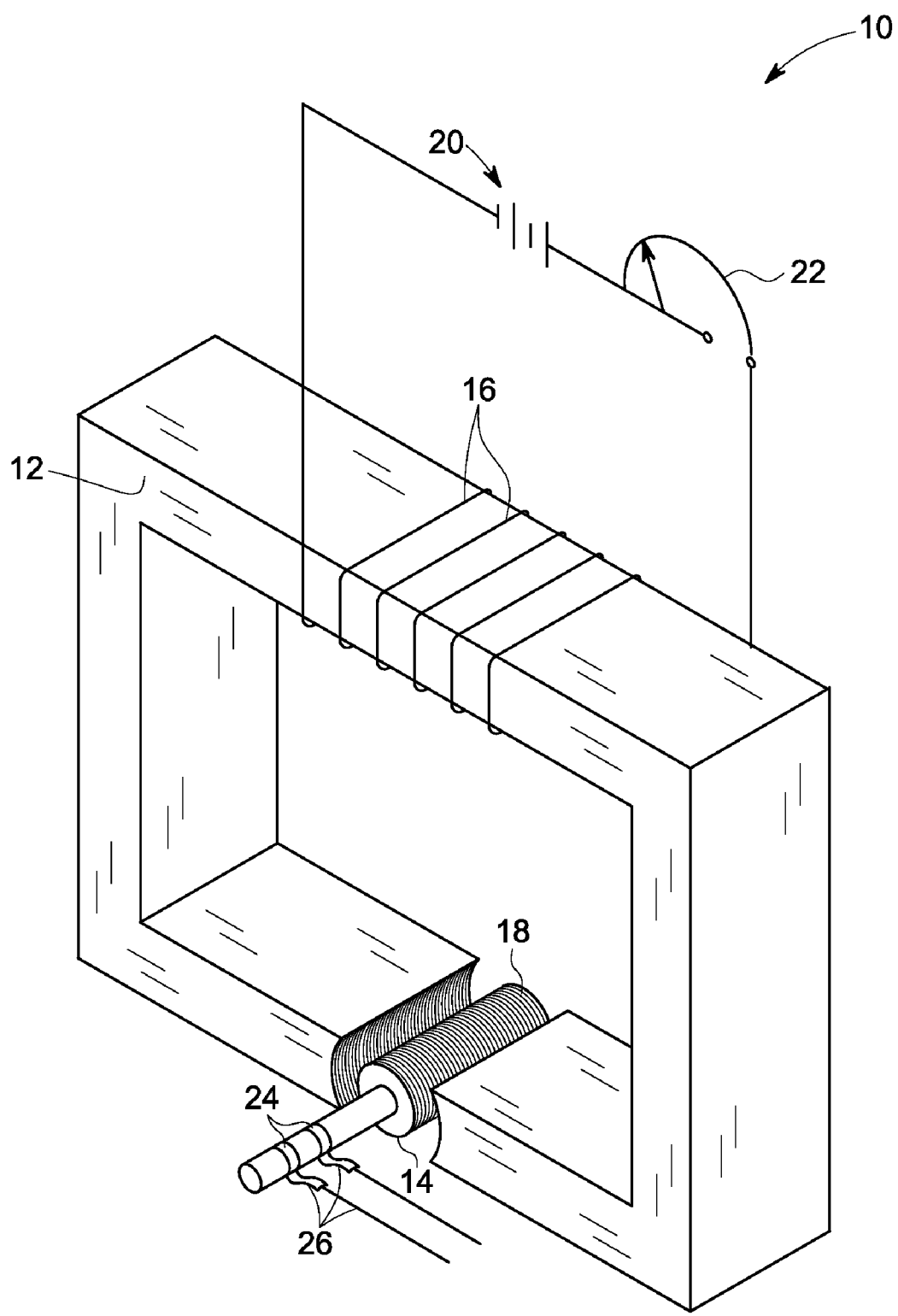
FIG. 1 is a diagrammatic illustration of an alternating current generator including a stator and a rotor with windings employing a non-linear or varying dielectric material as insulation in accordance with the invention.

Turning now to the drawings, FIG. 1 is diagrammatic illustration of an alternating current generator 10 including a stator 12 and a rotor 14. The stator 12 has surrounding windings 16. The windings 16 are, in the illustrated embodiment, stator windings. Similarly, the rotor 14 has surrounding windings 18. The stator windings 16 and the rotor windings 18 employ a non-linear dielectric material as insulation. Some non-limiting examples of the non-linear dielectric materials that may be used for the insulation include polyetherimide, polyethylene, polyester, polypropylene, polytetrafluoroethylene, polyvinylidene fluoride, and polyvinylidene fluoride coplymers films, which may be filled with at least one nanofiller. In a particular embodiment, the nanofiller may include ceramic fillers such as, but not limited to, lead zirconate, lead hafnate, lead zirconate titanate, lanthanum-doped lead zirconate stannate titanate, sodium niobate, barium titanate, strontium titanate and barium strontium titanate. The stator 12 may be excited by a current source 20 and a potentiometer or other resistive circuit 22 that has a variable resistance to regulate current into the stator windings 16. The rotor 14 may include multiple slip rings 24 to transfer power to and from the rotor 14. The slip rings 24 may include multiple brushes 26 that provide electrical connection to the rotor 14.

Figure 2:
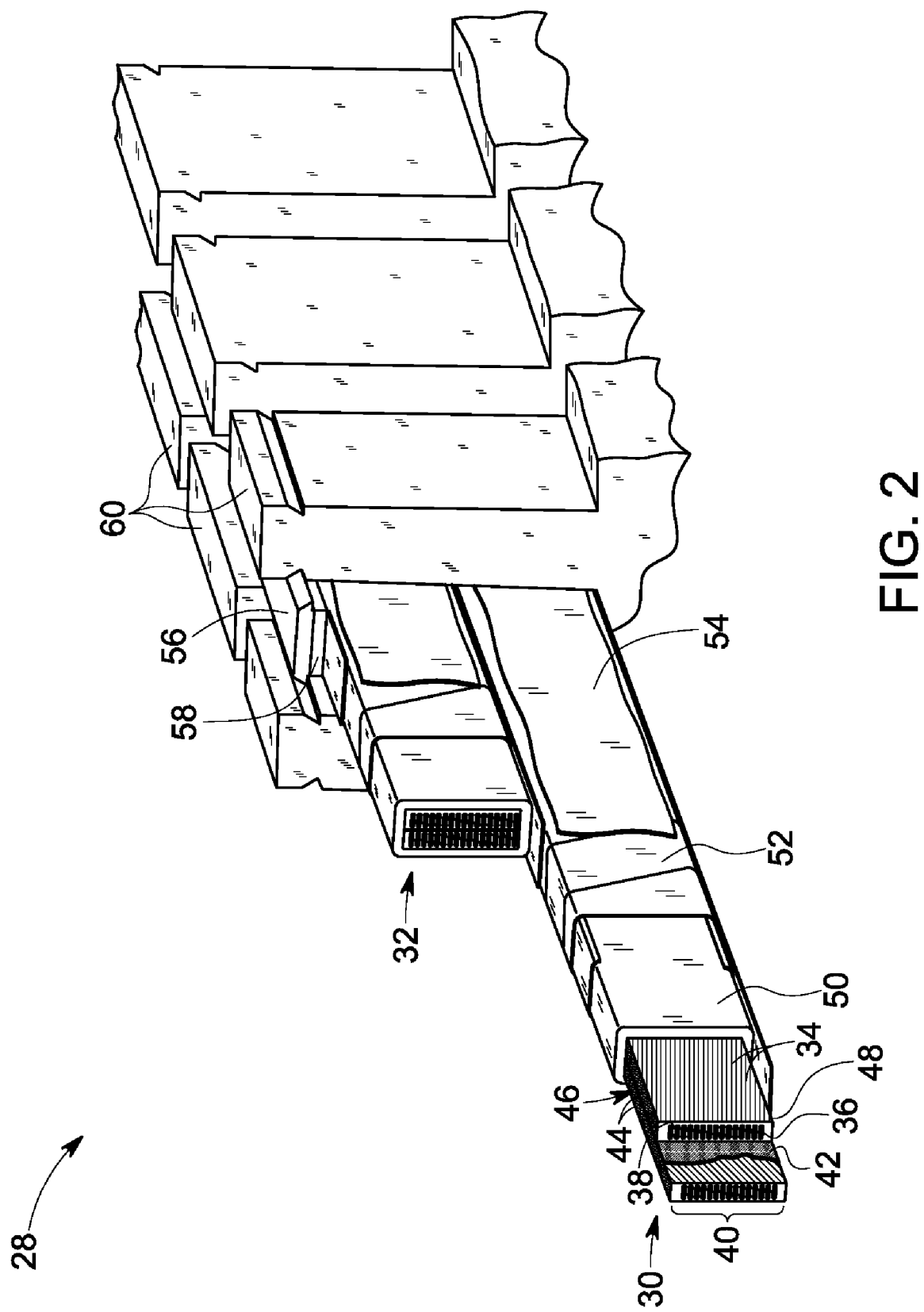
FIG. 2 is a perspective view of a stator bar of a dynamoelectric machine including a non-linear dielectric insulation system in accordance with the invention.

FIG. 2 is a perspective view of a stator 28 of a dynamoelectric machine with a non-linear dielectric insulation. The stator 28 may include multiple stator bars 30 and 32 that may be identical and may be disposed upon each other. The stator bars 30 may include multiple windings 34 that include multiple conductors 36 with non-linear dielectric insulation 38 between each of them. In a presently contemplated embodiment, the stator bars 30 may include two tiers 40 of hollow insulated conductors 36 that may be separated by a vertical layer 42 of non-linear dielectric insulation. A non-linear dielectric insulation layer 44 may also be applied on a top surface 46 and a bottom surface 48 of each of the tiers 40 of conductors 36. The conductors 36 may further be surrounded on sides by a layer of non-linear dielectric insulation forming a ground wall insulation 50. In a presently contemplated embodiment, the conductors 36 may be made of copper. In an example, the number of layers of ground wall insulation may typically vary from 7 to 16 layers of the non-linear dielectric composite insulation wound or wrapped depending on withstanding capability of an individual layer and the level of operating voltage to which the conductors 36 are being subjected.

In a particular embodiment, the non-linear dielectric insulation may include a mixed composite of a glass cloth, an epoxy binder, mica paper and a filler of size ranging from at least about 5 nm. Some non-limiting examples of the filler may include a micron filler and a nano filler. As noted above, such fillers may include lead zirconate, lead hafnate, lead zirconate titanate, lanthanum-doped lead zirconate stannate titanate, sodium niobate, barium titanate, strontium titanate, barium strontium titanate and lead magnesium niobate. In another example, the non-linear dielectric insulation may include polyetherimide, polyethylene, polyester, polypropylene, polytetrafluoroethylene, polyvinylidene fluoride, and polyvinylidene fluoride copolymers. Some non-limiting examples of mica may include muscovite, phlogopite, anandite, annite, biotite and bityte. The glass cloth may have varying amounts of woven density. Some non-limiting examples of the glass cloth are listed below in Table 1.

cloth is of a 1076 glass type with a plain weave having a warp count of 60 and a weight of 33 g/m$^2$. Similarly, other examples include 1070, 6060, 1080, 108, 1609, and 1280 glass types. Glass acts as a mechanical support for the insulation system and also adds inorganic content to the composite that improves the thermal conductivity of the final composite system. The mica acts as the primary insulation for the composite. The epoxy binder is the only organic portion of the composite insulation system and acts as the glue to hold the system together. Further, the nonlinear filler provides the nonlinear response to the insulation system as well as improving the thermal conductivity of the composite.

There are several ways to incorporate a filler into an insulation composite. Some non-limiting examples include extrusion of the filler and polymer forming a filled polymer system, solvent dispersion of the filler and polymer with subsequent evaporation of the solvent forming a film and using screen printing or dip coating techniques for incorporating the filler into the crossover points of the warp and weft fibers of the glass cloth. Furthermore, it has been found that silane treatment such as, but not limited to, 3-Glycidoxypropyl trimethoxysilane of the filler and the glass is important to desirable adhesion of the filler to the glass cloth and final composite structure. The choice of filler incorporation method depends on the final structure of the insulation composite. In an example, filled polymer films usually use extrusion, or solvent dispersion. In another embodiment, tapes of mica, glass cloth and epoxy resin usually use screen printing or dip coating on the glass cloth technique.

An electrical field stress may be experienced in regions around the conductors 36 and the layer of ground wall insulation 44 during machine operation. The non-linear dielectric insulation enables a more uniform distribution of electrical field. A stator bar armor 52 may shield the conductors 36. The stator bar 30 may also include a side ripple spring 54, a wedge body 56 and a wedge slide 58. In a particular embodiment, the stator bar armor 52, the side ripple spring 54, the wedge body 56 and the wedge slide 58 may be non-metallic. A non-limiting example of the bar armor 52 may include a glass fiber with a resin containing carbon powder for conductivity. In another example, the bar armor 52 may include a polyester fiber with a resin containing carbon powder. A non-limiting example of a material used in the side ripple spring 54 may be a glass fiber with carbon powder and a resin. Regions around the side ripple spring 54, the wedge body 56 and the wedge slide 58 may not experience a significant amount of electrical field stress. The stator bars 32 and 34 may be further enclosed by a metal core 60 of the dynamoelectric machine.

Figure 3:
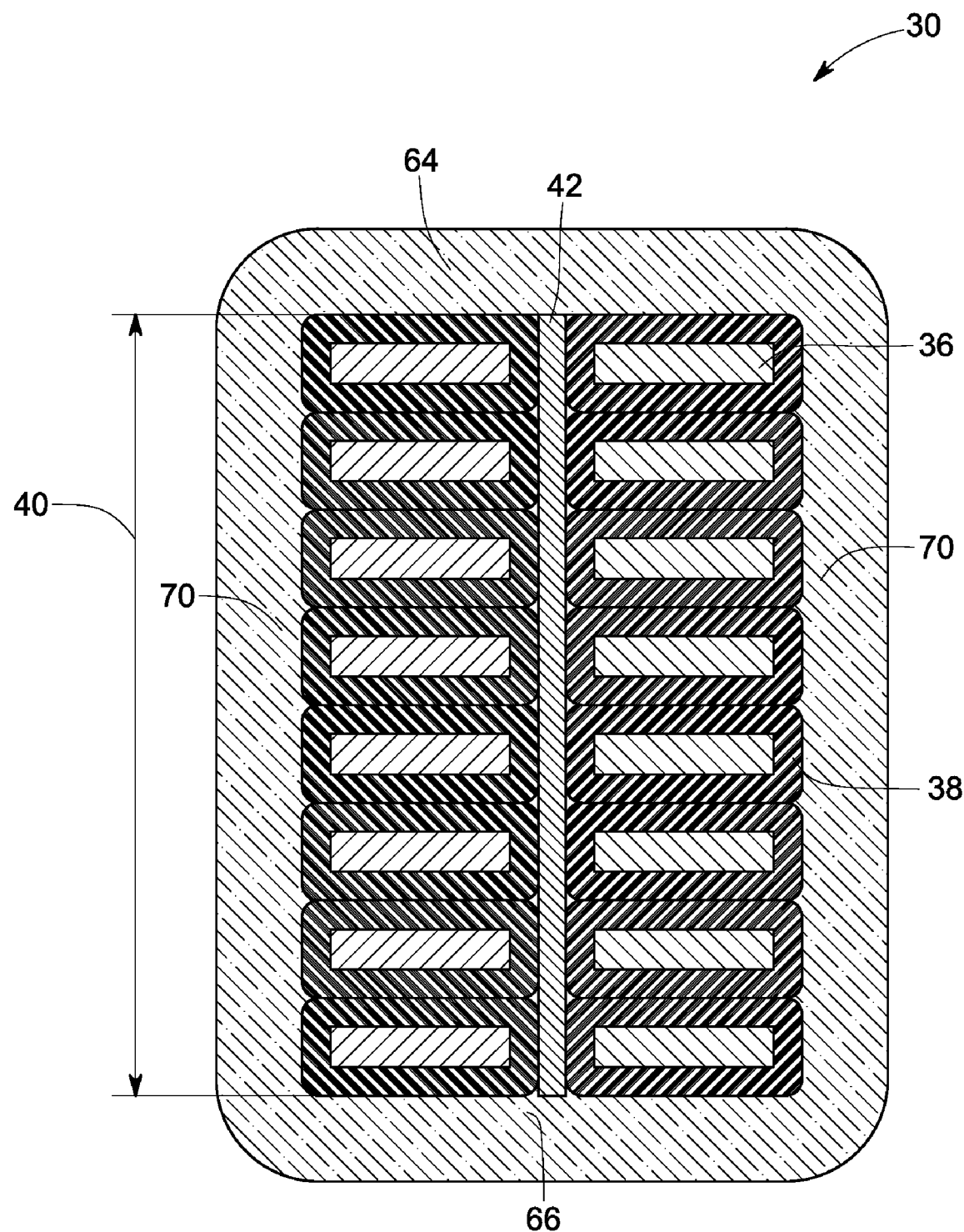
FIG. 3 is a cross-sectional view of the non-linear dielectric insulation system in FIG. 2 in accordance with the invention.

FIG. 3 is a cross-sectional view of the stator bar 30 in FIG. 2 illustrating insulating layers of non-linear dielectric material. The stator bar 30 may include two tiers 40 of hollow

TABLE 1

| Style | Weave | Count Warp | Yarns Fill | Weight oz/yd$^2$ | Weight g/m$^2$ | Thickness mils | Thickness mm | Strength Warp lbf/in | Strength Fill lbf/in |
|---|---|---|---|---|---|---|---|---|---|
| 1076 | Plain | 60 | 25 | 0.96 | 33 | 1.8 | 0.05 | 120 | 20 |
| 1070 | Plain | 60 | 35 | 1.05 | 36 | 2 | 0.05 | 100 | 25 |
| 6060 | Plain | 60 | 60 | 1.19 | 40 | 1.9 | 0.05 | 75 | 75 |
| 1080 | Plain | 60 | 47 | 1.41 | 48 | 2.2 | 0.06 | 120 | 90 |
| 108 | Plain | 60 | 47 | 1.43 | 48 | 2.5 | 0.06 | 80 | 70 |
| 1609 | Plain | 32 | 10 | 1.48 | 50 | 2.6 | 0.07 | 160 | 15 |
| 1280/1086 MS | Plain | 60 | 60 | 1.59 | 54 | 2.1 | 0.05 | 120 | 120 |

Glass cloth of various woven densities, weights, thicknesses and strengths have been listed. A first example of the glass conductors 36, as referenced in FIG. 2. The tiers 40 may be separated from each other by a vertical layer 42 of non-linear dielectric insulation, as referenced in FIG. 2. The vertical layer 42 may also be referred to as a vertical separator. The conductors 36 may be insulated from each other by a layer 38 of non-linear dielectric insulation, as referenced in FIG. 2. The layer 38 may also be referred to as a strand insulation. Further, a top layer 64 and a bottom layer 66 of non-linear dielectric insulation may be applied to a top surface and a bottom surface of each of the tiers 40 of the conductors 36 as referenced in FIG. 2. The top layer 64 and the bottom layer 66 may also be referred to as transposition fillers. A layer 70 of non-linear dielectric insulation may also be applied on sides of the conductors 36.

Figure 4:
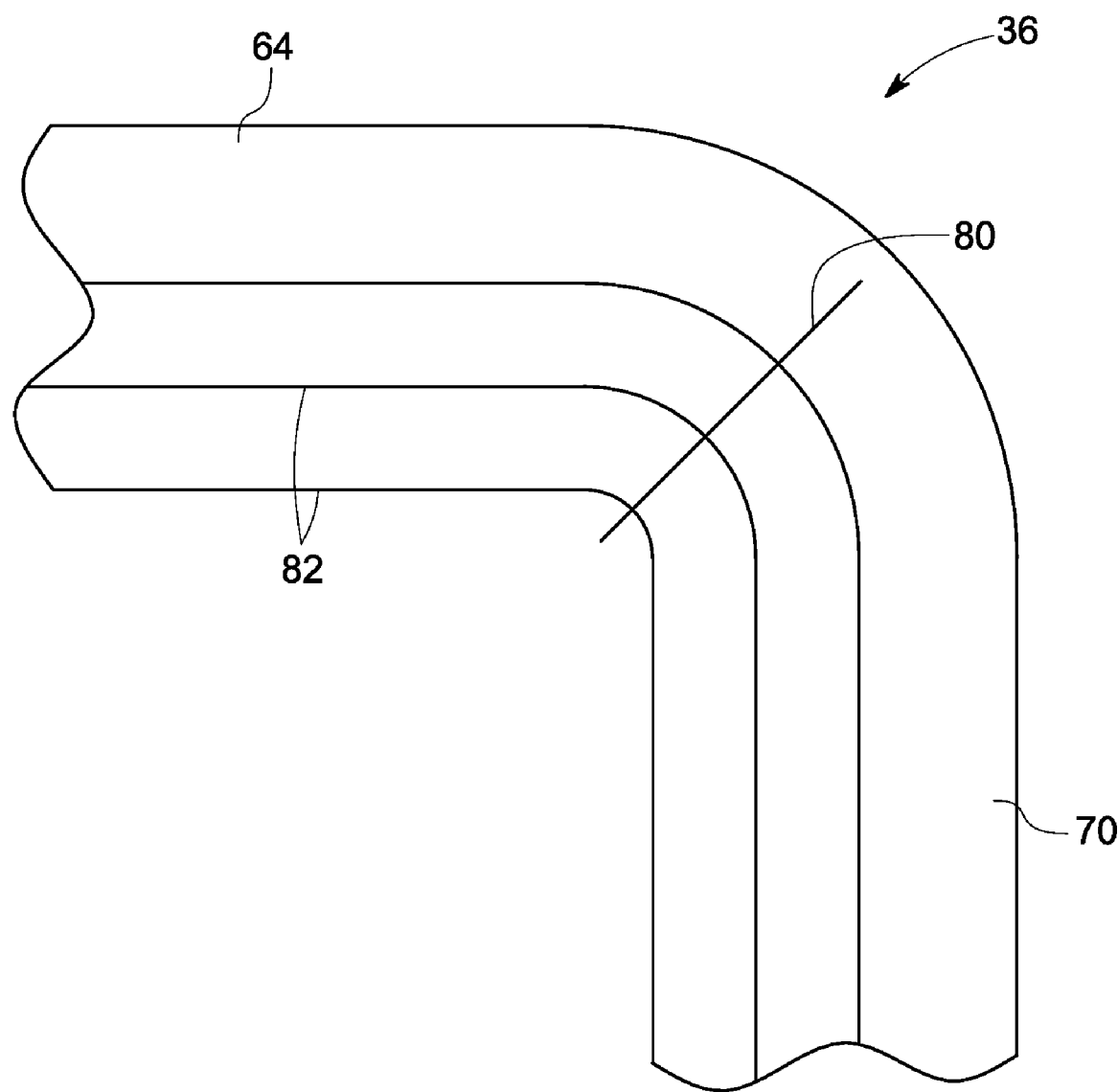
FIG. 4 is a schematic illustration of a corner of a conductor in the stator bar of FIG. 2 experiencing electrical stress.

FIG. 4 is an exemplary schematic illustration of electrical field stress experienced at a corner 80 of the electrical conductor 36 in FIG. 2. The corner 80 may include a non-linear dielectric insulation layer 64 and a non-linear dielectric insulation layer 70, as referenced in FIG. 3. The corner 80 is a region on the conductor 36 that may undergo maximum electrical field stress during operation. It is desirable to reduce the electrical stress. A reduction in electrical stress may increase a voltage rating of the machine. The non-linear dielectric insulation layers 64 and 70 distribute the electrical field uniformly at the corner 80 so as to minimize stress that has occurred due to an uneven distribution of the electrical field. As the electrical field stress increases at the corner 80, the non-linear dielectric layers 64 and 70 adapt accordingly so as to provide a more uniform electrical field distribution 82 around the corner 80 than would be present if conventional uniform dielectric strength materials were used, thus protecting the conductor 36 from potential electrical damage.

In another illustrated embodiment of the invention, a method 84 of forming an insulation in an electrical machine may be provided. An insulating layer having a dielectric constant that varies as a function of voltage may be disposed around at least a portion of the winding in step 86. In a particular embodiment, the insulating layer may have a thermal conductivity of at least about 0.5 W/mK. In another embodiment, the insulating layer may be made of mica, epoxy resin, glass cloth and a ceramic filler. In yet another embodiment, the glass cloth and the ceramic filler may be coated with silane. In a presently contemplated embodiment, the ceramic filler may be attached to the glass cloth via a technique of screen printing or dip coating.

Improved thermal conductivity of the insulation system is also an essential property for the design of new high energy density devices. The insulation system with an improved thermal diffusion eliminates excess heat harmful to the insulation system that may be produced in high energy density electrical machines. Inorganic materials and glasses have higher thermal conductivity than organic systems. In an example, an epoxy resin system has a thermal conductivity of approximately 0.2 W/mK and typical inorganic oxides are in the range of 10-20 W/mK. Inorganic nitrides have even higher conductivities. Some non-limiting examples include aluminum nitride with a thermal conductivity of 170 W/mK and boron nitride with a thermal conductivity of 55 W/mK. Thus, addition of inorganic compounds and a reduction in overall organic content of a mixture improves thermal conductivity of composite insulation systems. In an example, thermal conductivity of a base epoxy, a glass cloth, mica insulation composite ranges from 0.25-0.35 W/mK depending on the type of glass and level of resin content. With the addition of the nonlinear oxides mentioned earlier, the thermal conductivity of the filled epoxy, glass cloth, mica composite can achieve at least about 0.5 W/mK.

EXAMPLES

The examples that follow are merely illustrative and should not be construed to limit the scope of the claimed invention.

Figure 5:
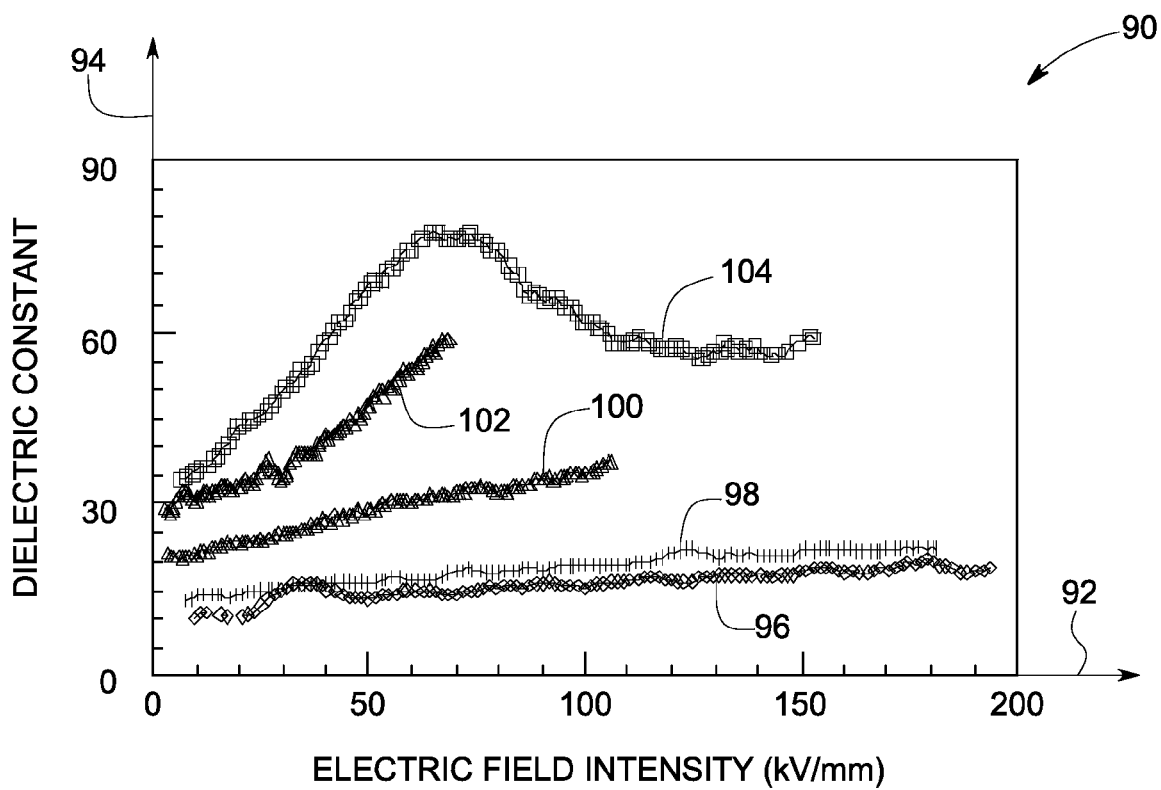
FIG. 5 is a graphical comparison of dielectric constant as a function of electric field intensity of polyvinylidene fluoride film without and with fillers, all of which may be used in an electrical machine and with windings in accordance with the invention.

FIG. 5 is a graphical comparison 90 of dielectric constant as a function of electric field intensity for a polyvinylidene fluoride (PVDF) film without fillers and with fillers. The X-axis 92 represents electric field intensity in kV/mm. The Y-axis 94 represents dielectric constant of the PVDF film. Curve 96 represents dielectric constant of a PVDF film without a filler. As can be seen, the dielectric constant does not vary significantly as a function of the electric field intensity. Curve 98 represents dielectric constant of a PVDF film with 20% by volume of a micron lead zirconate filler. Similarly, curves 100, 102, and 104 represent dielectric constant as a function of electric field intensity for a PVDF film with 20% by volume of a nano lead zirconate filler, 40% by volume of a micron lead zirconate filler and 40% by volume of a nano lead zirconate filler respectively. As observed, the dielectric constant increases significantly from about 30 to peak at about 80 as a function of electric field intensity in the case of 40% by volume of a nano lead zirconate filler. Hence, addition of nanofillers in the PVDF film increases the variation of the dielectric constant with electrical field and enhances adaptability of an insulation system to fluctuations in electrical field stress.

Figure 6:
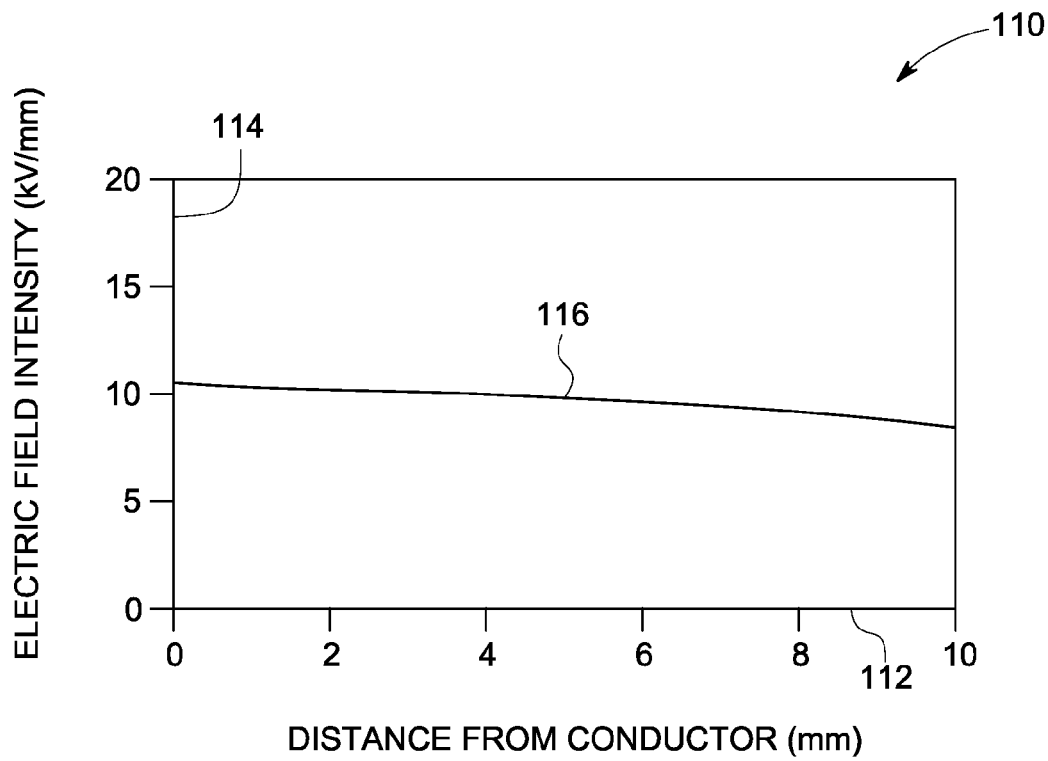
FIG. 6 is a graphical illustration of electric field strength around the corner in FIG. 4.

FIG. 6 is a graphical illustration 110 of the electrical field profile at the corner 80 in FIG. 4 as a function of distance from the conductor 36 in FIG. 2 having a non-linear dielectric insulation layer. The X-axis 112 represents distance from the conductor 38 through the non-dielectric insulation layer in mm. The Y-axis 114 represents electric field intensity in kilovolts/mm. As can be seen from curve 116, the electric field is stable at 10 kV/mm with the distance from the conductor 36. In electrostatics, product of the dielectric constant and electric field depends on potential difference and dielectric properties of a medium. If the dielectric constant were held constant, the local electric field on a surface adjacent to an electrically conducting element would be very high due to its relatively small area. The electric field would then decrease and reach a minimum at an outermost surface of the insulation that is at ground potential. However, if the dielectric constant were allowed to increase with the electric field, this compensating effect would force a uniformity across the entire material as shown. Thus, the non-linear dielectric insulation layer provides a generally uniform field distribution within the conductor eliminating or reducing the possibility of electrical damage to the conductor.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrical machine comprising:
    a stator and rotor winding made of a conductive material; and
    an insulating layer comprising at least one nonlinear ceramic filler comprising one of lead zirconate, lead hafnate, lead zirconate titanate, lanthanum-doped lead zirconate stannate titanate, and sodium niobate, said insulating layer is disposed around at least a portion of the winding having a dielectric constant that increases with increase in electric field intensity.

2. The electrical machine of claim 1, the insulating layer comprising polymer composites.

3. The electrical machine of claim 2, the polymer composites comprising polyetherimide, polyethylene, polyester, polypropylene, polytetrafluoroethylene, polyvinylidene fluoride, and polyvinylidene fluoride copolymers.

4. The winding of claim 1, the insulating layer comprising a thermal conductivity of at least about 0.5 W/mK.

5. A stator and rotor winding of an electrical machine comprising a polymeric insulation system including at least one polymeric layer and at least one nonlinear ceramic filler comprising one of lead zirconate, lead hafnate, lead zirconate titanate, lanthanum-doped lead zirconate stannate titanate, and sodium niobate, said insulation system having a dielectric constant that increases with increase in electric field intensity.

6. The winding of claim 5, wherein the dielectric constant increases with voltage.

7. The winding of claim 5, the polymeric insulation system comprising polymer composites.

8. The winding of claim 7, the polymer composites comprising polyetherimide, polycarbonate, polyethylene, polyester, polypropylene, epoxy, silicone, polytetrafluoroethylene, polyvinylidene fluoride, and polyvinylidene fluoride coploymers.

* * * * *